United States Patent
Namur

(10) Patent No.: US 8,153,002 B2
(45) Date of Patent: Apr. 10, 2012

(54) DEVICE FOR TREATING WATER, PARTICULARLY A FILTRATION DEVICE, AND CARTRIDGE

(75) Inventor: Marc Namur, Darmstadt (DE)

(73) Assignee: Brita GmbH, Taunusstein (DE)

( * ) Notice: Subject to any disclaimer, the term of this patent is extended or adjusted under 35 U.S.C. 154(b) by 260 days.

(21) Appl. No.: 12/449,505

(22) PCT Filed: Feb. 13, 2008

(86) PCT No.: PCT/EP2008/051721
§ 371 (c)(1),
(2), (4) Date: Aug. 27, 2009

(87) PCT Pub. No.: WO2008/098952
PCT Pub. Date: Aug. 21, 2008

(65) Prior Publication Data
US 2010/0116728 A1   May 13, 2010

(30) Foreign Application Priority Data
Feb. 13, 2007   (DE) .......................... 10 2007 006 970

(51) Int. Cl.
*B01D 27/08* (2006.01)
(52) U.S. Cl. ......... 210/249; 210/282; 210/287; 210/444
(58) Field of Classification Search .................. 210/234, 210/235, 249, 282, 288, 429, 440, 443, 444, 210/DIG. 17, 287, 289
See application file for complete search history.

(56) References Cited

U.S. PATENT DOCUMENTS

| | | | | |
|---|---|---|---|---|
| 3,061,106 A | * | 10/1962 | Bradbury | 210/232 |
| 3,907,688 A | * | 9/1975 | Close | 210/424 |
| 4,529,515 A | * | 7/1985 | Selz | 210/234 |
| 4,725,354 A | * | 2/1988 | Thomsen et al. | 210/232 |
| 5,653,871 A | | 8/1997 | Thomsen | |
| 2003/0217958 A1 | | 11/2003 | Reid | |
| 2004/0211931 A1 | | 10/2004 | Olson et al. | |
| 2005/0067342 A1 | | 3/2005 | Bassett et al. | |
| 2006/0032202 A1 | | 2/2006 | Reid | |

FOREIGN PATENT DOCUMENTS

| | | |
|---|---|---|
| DE | 602 08 437 T2 | 8/2006 |
| WO | WO 01 64312 A1 | 9/2001 |
| WO | WO 2006/050114 A1 | 5/2006 |

\* cited by examiner

*Primary Examiner* — Matthew Savage
(74) *Attorney, Agent, or Firm* — Hudak, Shunk & Farine Co. LPA

(57) ABSTRACT

A device for treating water, particularly a filtration device, including a cartridge, which has a receptacle for receiving treatment agents for water, particularly for receiving filtration agents, and a connecting head disposed on the receptacle, wherein the connecting head at the outer surface thereof has at least one inlet opening and at least one outlet opening. The device further includes a connecting element, which has a holder for the connecting head with at least one inflow opening and an outflow opening, which are connected to the inlet and outlet openings of the connecting head in a sealing manner by means of sealing elements. The connecting head is tapered toward the free end, wherein the outer surface has at least one first curved outer surface section, which is inclined toward the longitudinal axis of the cartridge, and a second outer surface section opposite from the first outer surface section. The inlet and outlet openings are located in the first and/or the second outer surface sections. The connecting head is inserted in the holder in the axial direction, wherein the inside surface of the holder has first and second inside surface sections that complement at least the first and second outside surface sections.

36 Claims, 15 Drawing Sheets

DEVICE FOR TREATING WATER, PARTICULARLY A FILTRATION DEVICE, AND CARTRIDGE

FIELD OF THE INVENTION

The invention concerns a device for treating water, particularly a filtration device, with a cartridge, which has a receptacle for receiving treatment agents for water, especially for receiving filtration agents, and a connecting head arranged on the receptacle, which has at least one inlet opening and at least one outlet opening, and with a connecting element, which has a holder for the connecting head with at least one inflow opening and at least one outflow opening, which are connected to the inlet and outlet openings of the connecting head in a sealing manner by means of sealing elements, according to the preamble of claim 1. The invention also pertains to a cartridge, particularly a filtration cartridge.

BACKGROUND OF THE INVENTION

Treating water is understood as, besides filtration, also the measured dispensing of substances into the water. The dispensing of substances can also be combined with a filtration of the water.

Filtration cartridges are understood as, first, those which have a sievelike structure for mechanical filtration. Secondly, filtration cartridges are understood as also those which contain, besides a sievelike structure, at least one filtration medium, such as one in granulate form, which serves for chemical and/or mechanical removal and/or decreasing of organic and/or inorganic impurities. Such filtration cartridges thus enable a nonmechanical filtration, which can be combined with a mechanical filtration. These filtration cartridges are used for optimization of water, meaning by optimization a mechanical and/or nonmechanical filtration. This includes, e.g., the softening and deliming of drinking water.

The filtration can be pressure-operated, i.e., using excess pressure or partial vacuum, or it can be done by gravity.

WO 01/64312 discloses various embodiments of filtration cartridges that basically have a receptacle with filtration agents and connecting heads at the bottom and at the top. In a first embodiment, cylindrical connections are specified, which are inserted in the axial direction into correspondingly configured connecting elements. Inlet and outlet channels extend in the axial and, thus, the inserting direction.

A second embodiment shows connections bent at an angle, which allow the filtration cartridges to be pushed onto a correspondingly configured connecting element perpendicular to their lengthwise axis.

A third embodiment has a lower ball and socket joint head and an upper connecting head, which is bent at an angle, so that it can be inserted into the connecting element in a direction perpendicular to the lengthwise axis. By swinging the filtration cartridge about the ball and socket head, the filtration cartridge and the connecting element are brought together. The outlet channel likewise extends in the inserting direction. A modification of the upper connecting head calls for an outlet channel that extends in the lengthwise direction of the filtration cartridge.

What is common to all embodiments is two connecting heads, so that two inserting or connecting processes are also required when replacing the filtration cartridge, in order to connect the filtration cartridge properly. Furthermore, the ball and socket heads are costly and have sealing problems, since the ball and socket head also receives the inlet channel and the sealing elements can sometimes get damaged during the swinging movement of the filtration cartridge.

US 2006/0032202 specifies a filtration device with several filtration cartridges arranged next to each other, each having a single connecting head at the upper end. The connecting head contains both the inlet and the outlet channel. The filtration cartridge is inserted by its lower end into a swivel holder and then turned to join the connecting head to the connecting element.

Furthermore, filtration cartridges are known with a cylindrical connecting head, which are screwed by a turning movement into the connecting element.

U.S. Pat. No. 5,653,871 discloses a filtration device in which the inlet and the outlet channel are arranged opposite each other in the cylindrical connecting head. The sealing is done by O-rings, which are inserted into a groove made in the circumference of the cylindrical surface. For connecting heads which are made by the injection molding process, for example, the separation joints due to the molding dies used run through this groove, which favors leaks. Since the cylindrical holder of the connecting element is adapted by its internal cross section to the external cross section of the cylindrical connecting head of the filtration cartridge and a seal must be guaranteed by the O-rings, substantial frictional forces are required when inserting the filtration cartridge. Furthermore, the sealing elements may be subject to wear.

The same problems also occur with the device of US 2004/0211931 A1. The connecting head of the filtration cartridge consists of two sections, namely, a cylindrical section, which carries at least one O-ring seal, and a semicylindrical section, on which a beveled surface with outlet openings is arranged. The beveled surface serves as a cam surface for activating a valve arranged in the connecting element.

SUMMARY OF THE INVENTION

The problem of the invention is to provide a device for the treating of water with a cartridge, which can be easily replaced, while at the same time the required seal is guaranteed in the connection region of cartridge and connecting element.

This problem is solved with a device for treating of water that is characterized in that the connecting head is tapered toward the free end, while the outer surface has at least one first outer surface section which is tilted or curved toward the lengthwise axis of the cartridge and a second outer surface section which is opposite to the first outer surface section, the inlet and outlet openings lie in the first and/or second outer surface section, and the connecting head is inserted in the holder in the axial direction, while the inside surface of the holder has first and second inside surface sections that complement at least the first and second outside surface section.

Axial insertion of the connecting head is understood as a movement of the cartridge in the direction of the lengthwise axis of the cartridge—preferably without additional rotary motion.

The tapering of the connecting head has the benefit that the axial insertion of the connecting head is largely free of force, because the outside surface of the connecting head and the inside surface of the holder do not make contact at first. Insofar as seal elements are provided and they protrude relative to the outside surface or inside surface, the seal elements make contact with their opposing surfaces only in the end phase of the insertion process. The seal elements are exposed to friction and compression only for a short remaining length of travel, so that the seal elements are hardly exposed to any wear when replacing the cartridge.

Thanks to the opposing outside surface sections and their complementary inside surface sections of the holder, the required pressure is exerted on the seal elements for the remaining length of travel to ensure the desired seal in the region of the openings.

When loosening the cartridge, an axial force is needed only in the beginning, so that only a slight force overall needs to be exerted when replacing the cartridge.

Another benefit is that, in operation of the device, the liquid flows in and out more or less perpendicular to the lengthwise axis of the cartridge, depending on the degree of inclination or curvature of the first and/or second outer surface sections or their complementary configured first and second inside surface sections of the holder. This produces a force component perpendicular to the lengthwise axis of the cartridge, which fixes the connecting head inside the holder. Preferably the sections of the channels which emerge into the respective inlet and outlet openings of the connecting head and the connecting element are oriented perpendicular or slanting to the lengthwise axis.

Preferably, the connecting head is asymmetrical in shape. Thanks to the asymmetrical configuration of the connecting head, the holder is also respectively asymmetrical in configuration. This ensures that there is only a single installation position in which the inlet and outlet openings or the inflow and outflow openings of the holder lie opposite each other. This rules out any wrong positioning of the cartridge.

Preferably, the first outer surface section is a flat surface which is tilted relative to the lengthwise axis of the cartridge by an angle $\alpha$, with $0<\alpha<90°$. Preferably, the angle $\alpha$ is under 20°, especially preferably in the region between 1° and 5° and especially 2.5° to 3.5°. A flat surface forms a sliding bevel which facilitates the inserting of the cartridge. An angle of 1° to 5° has proven to be especially advantageous, because it prevents a jamming of the preferably plastic components, which would particularly hinder the loosening of the cartridge.

As an alternative to a beveled surface, the first outer surface section can be curved, with a spherical or conical surface or a segment of a spherical or conical surface being preferred. Instead of geometrically described surfaces, also so-called free-form curved surfaces are possible. It is possible to configure the entire connecting head as a cone, a truncated cone or a spherical cap or hemisphere, or as a free-form surface.

All of the first outer surface sections producing the tapering of the connecting head can be combined with second outer surface sections, which are likewise fashioned, e.g., as flat or curved surfaces.

If the second outer surface section is likewise a flat surface, this one can also be oriented parallel to the lengthwise axis of the cartridge, which corresponds to $\beta=0$. The flat surface can be tilted to the lengthwise axis of the cartridge, just as with the first outer surface section, so that the connecting head will have an outer contour in the form of a roof. The angles $\alpha$ and $\beta$ can be equal to each other in this case. In order to define a distinct installation position, preferably $\alpha\neq\beta$.

According to another embodiment, the second outer surface section can be curved. In regard to a distinct installation position, preferably the curvatures of the first outer surface section and the second outer surface section are not equal.

Preferably, the inlet and outlet openings and/or the inflow and outflow openings are each surrounded by at least one sealing element. Preferably sealing elements are O-rings or flat gaskets. The sealing element is inserted, for example, in a groove, which surrounds the respective opening. The groove is located in the first and/or second outer surface section or in the complementary inside surface sections of the holder, which brings the advantage that one can avoid tool and die related separation joints in the region of the groove especially when the components are made by the injection molding technique.

At least one outer surface of the connecting head can have recesses. The recesses can have any desired shape and serve to simplify the manufacturing of the connecting head. Preferably, the first and second outer surface sections also have such recesses. This means that the size of the outer surface sections and thus the friction when fitting together the connecting head and the connecting element are reduced.

Preferably, the smallest inside cross section of the holder is smaller than the smallest outside cross section of the connecting head. This configuration, in event of any abrasion occurring on the seal elements and/or the respective surface sections, allows a slightly deeper insertion of the connecting head in the holder to ensure the desired seal in the region of the openings.

In the event that no distinct installation position can be defined due to the configuration of the first and second outer surface sections, such as when the connecting head has a symmetrical design, it can be advantageous for the connecting head to have at least one guiding means, which cooperates with a guiding means of the holder. These can be grooves and/or ridges, for example, which cooperate when connecting head and holder are fitted together and distinctly define the installation position.

To attach the cartridge once inserted, it is advantageous to provide a locking element, and preferably the connecting element will have the locking element, which engages with the cartridge. Such a locking element can be a sleeve ring. It is advantageous for the sleeve ring to be configured as a bayonet ring. The bayonet ring together with corresponding locking elements forms a bayonet lock, preferably designed so that no axial forces are acting to further shove the inserted connecting head into the holder during the locking process. According to another embodiment, the closure, especially the bayonet lock, will shove the filtration cartridge for a predetermined travel path into the holder, so that a definite pressure is exerted on the sealing element. It is also conceivable to provide the locking element, such as the sleeve ring, on the cartridge.

Preferably at least the connecting head and/or the holder consist of a plastic material, and according to a specific embodiment these components are injection molded.

Preferably, the connecting element has an ejector. An ejector supports the loosening of the connecting head in the holder, which can be advantageous, for example, when the holder has inside surfaces complementary to all surfaces of the connecting head, so that the cartridge may sometimes sit too firmly inside the holder.

The cartridge is characterized in that the connecting head has a cross section that is tapered with increasing distance from the receptacle toward the free end, while the outer surface has a first outer surface section which is tilted or curved toward the lengthwise axis of the cartridge and a second outer surface section which is opposite to the first outer surface section to define the cross section, each at least one inlet opening lying in the first outer surface section or the second outer surface section and each at least one outlet opening lying in the first outer surface section or the second outer surface section.

Advantageous embodiments are the subject of the subclaims, which have already been explained in connection with the device.

BRIEF DESCRIPTION OF THE DRAWINGS

Sample embodiments of the invention shall be explained more closely below by means of the drawings. There are shown.

DETAILED DESCRIPTION OF THE INVENTION

Figure 1:
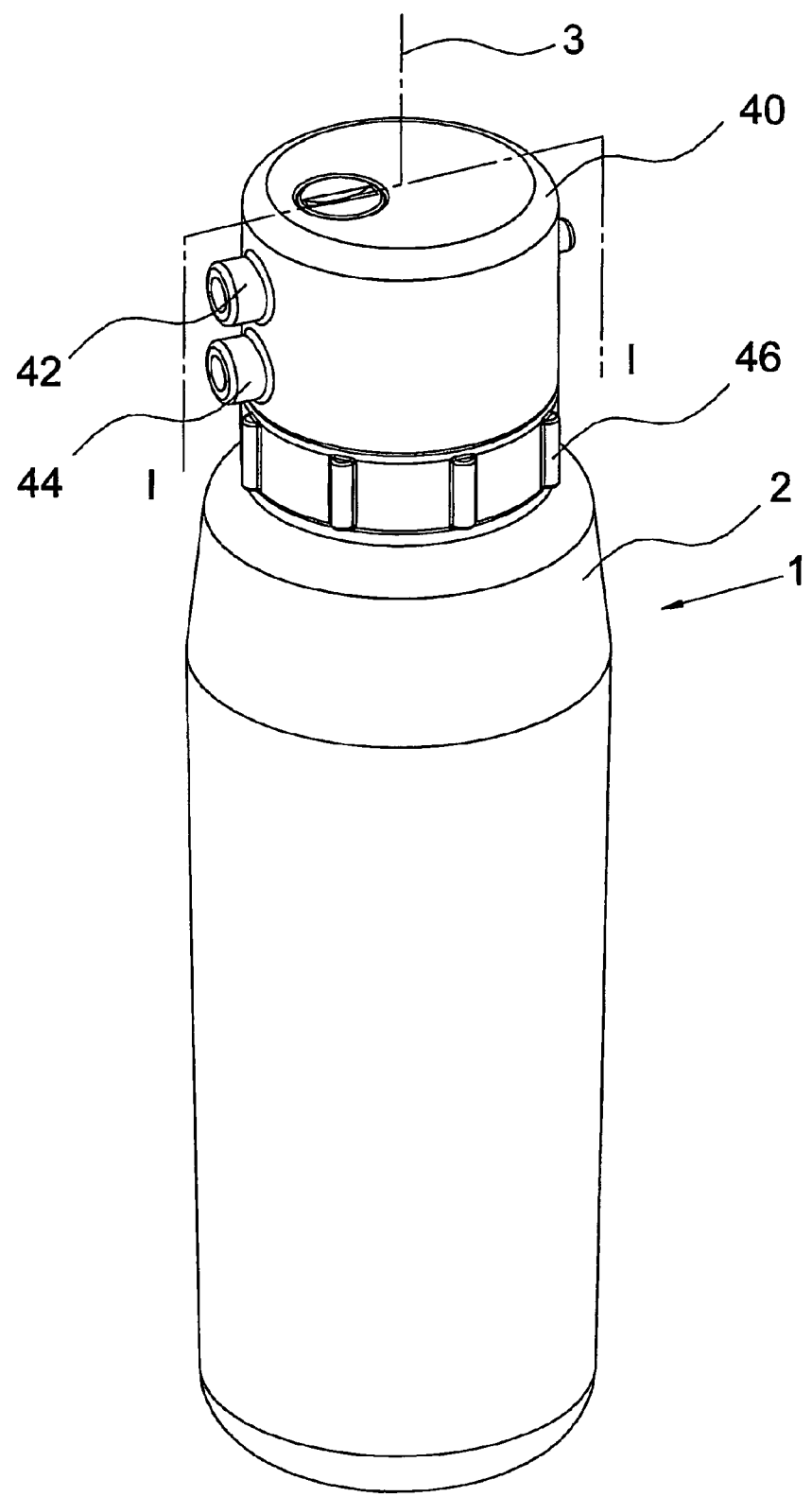
FIG. 1 a perspective view of a device with cartridge and connecting element.

FIG. 1 shows a perspective view of a device for treating of water, comprising a cartridge 1 with a receptacle 2 and a connecting element 40. The connecting element 40 is in the shape of a cap and it has a sleeve ring 46 at the lower edge, by which the connecting element 40 is fixed on the cartridge 1.

At the side of the connecting element 40 are molded on an inlet nipple 42 and an outlet nipple 44. The two nipples 42, 44 extend perpendicular to the lengthwise axis 3 of the cartridge 1 and arranged alongside each other in the way shown here.

Figure 2:
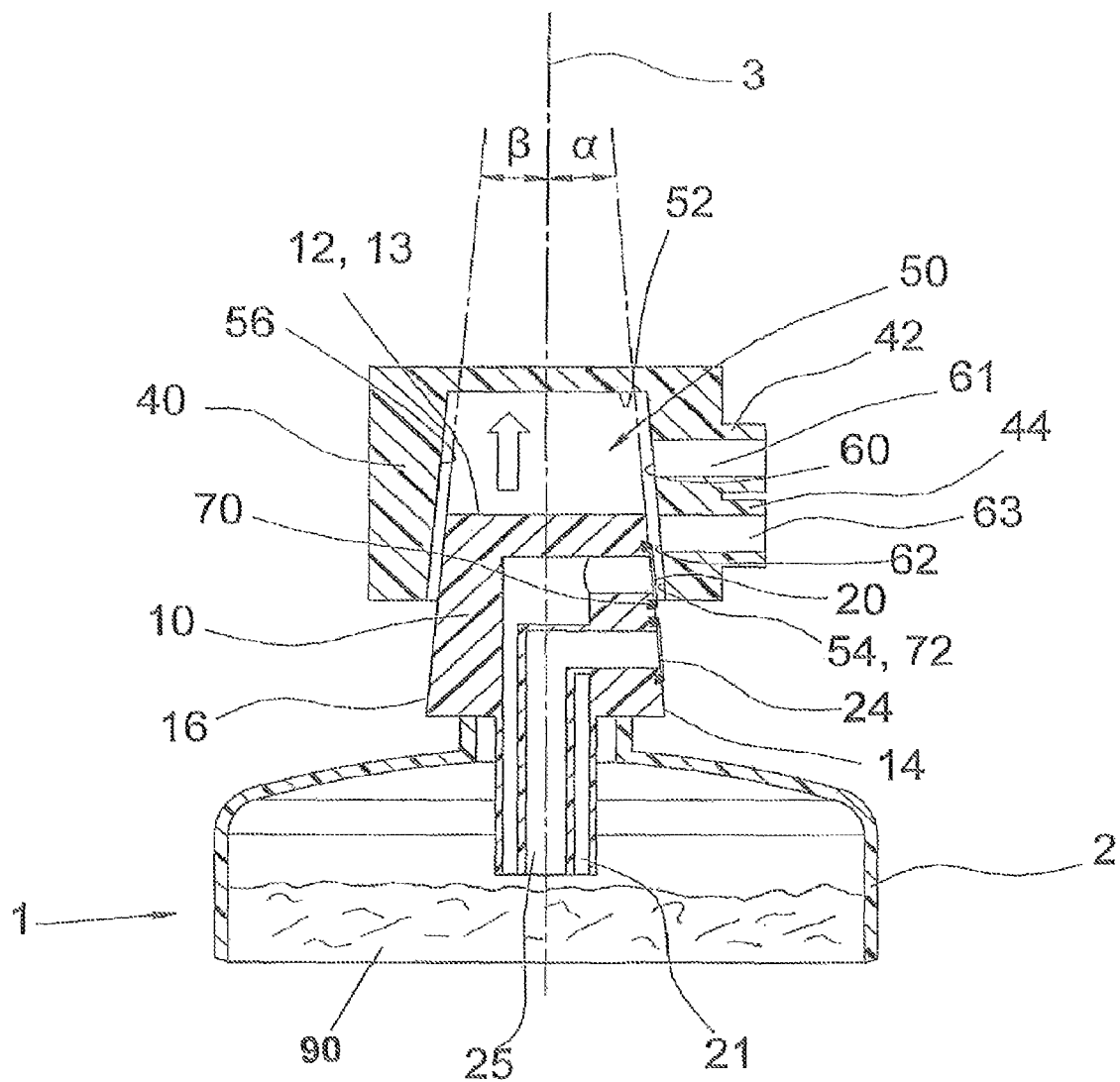
FIG. 2 a section through the device of FIG. 1 during the inserting of the cartridge, FIG. 3 a section through the device of FIG. 1 with cartridge inserted, FIG. 4a, b perspective views of the connecting head and the upper part of the cup of a cartridge, FIG. 5 a vertical section through the connecting head of the cartridge shown in FIG. 4a, b, FIG. 6 a side view of a connecting head according to another embodiment, FIGS. 7 to 12 perspective views of connecting heads according to other embodiments, FIG. 13 a section through the connecting head and connecting element of another embodiment, and FIG. 14 a perspective view of a connecting element with ejector.
Figure 3:
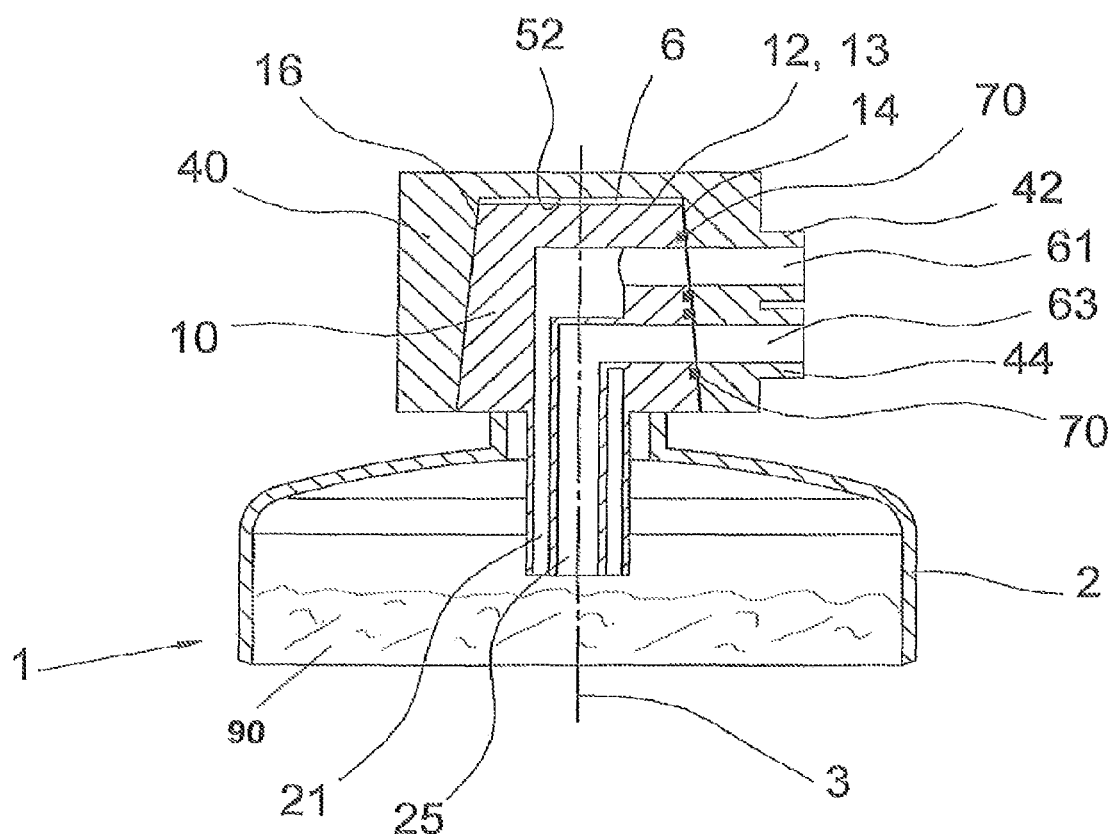

The receptacle 2 of the cartridge 1 is filled with a suitable treatment agent 90, see FIGS. 2 and 3, depending on the application. This can be a filtration agent and/or an agent putting out substances into the liquid being treated. The device shown is preferably used as a pressure-operated device, in particular, for preparation of drinking water.

FIG. 2 shows a vertical section along line I-I through the upper region of the device of FIG. 1. FIG. 2 shows the process of inserting the connecting head 10 of the cartridge 1 into the holder element 40.

The cartridge 1 has its connecting head 10 on the receptacle 2, whose cross section tapers with increasing distance from the receptacle 2, i.e., toward its free end 13. From FIG. 2 one notices that the connecting head 10 has a first outer surface section 14 and, opposite from this, a second outer surface section 16. Moreover, the connecting head 10 has an end surface 12, as well as side surfaces not shown. Details on the surface configuration of the connecting head 10 will be discussed in the context of the different embodiments of FIGS. 4a to 12.

In the embodiment shown in FIG. 2, the two outer surface sections 14 and 16 each form flat surfaces, which are arranged inclined by angles $\alpha$ and $\beta$ relative to the lengthwise axis 3 of the cartridge 1, thereby accomplishing the tapering of the connecting head 10. The connecting head 10 is symmetrical in shape, i.e., $\alpha=\beta$.

Inside the connecting head 10 is arranged an inlet channel 21 and an outlet channel 25, both of which emerge by their sections oriented perpendicular to the lengthwise axis 3 in the first outer surface section 14. The inlet opening 20 and the outlet opening 24 lie in the plane of this outer surface section 14. The openings 20, 24 are each surrounded by a sealing element 70 in the form of an O-ring. The O-rings are inserted in corresponding grooves in the outer surface section 14 and protrude slightly with respect to the outer surface section 14.

The connecting element 40 is in the shape of a cap and has a holder 50 on the inside, which has inside surface sections 54, 56 that are complementary to the outer surface sections 14 and 16 of the connecting head 10, with an inclination corresponding to that of the two outer surface sections 14, 16 of the connecting head. Moreover, the connecting element 40 likewise has an end surface 52 and an inflow channel 61 with inflow opening 60, as well as an outflow channel 63 with outflow opening 62. The openings 60, 62 lie in the first inside surface section 54, which at the same time serves as a sealing surface 72, against which the sealing elements 70 lie when the connecting head 10 is fully pushed in, as shown in FIG. 3.

While the connecting head 10 is being introduced into the holder 50, the surface sections 14, 16 and 54, 56 are spaced apart. Thus, there is no friction produced by the sealing elements 70. Upon being pushed in further, the outer surface sections 14, 16 approach the inside surface sections 54, 56, until the surface sections 14, 15, 54, 56 lie against each other as the sealing elements 70 are pressed together. In this end position, the openings 20 and 60, as well as 24 and 62, lie opposite each other, so that inflow and outflow are each joined together in a sealing manner (FIG. 3).

Since the smallest inside cross section of the holder 50 of the connecting element 40 is smaller than the smallest outer cross section of the connecting head 10, i.e., in the present instance the end surface 52 is smaller than the end surface 12, an intermediate space 6 is present between the two end surfaces 12 and 52 when the connecting head 10 is completely pushed in. The intermediate space 6 enables a further pushing of the connecting head 10 into the holder 50 when necessary under more intense compression of the sealing elements or after the sealing elements have become worn down.

Figure 4A:
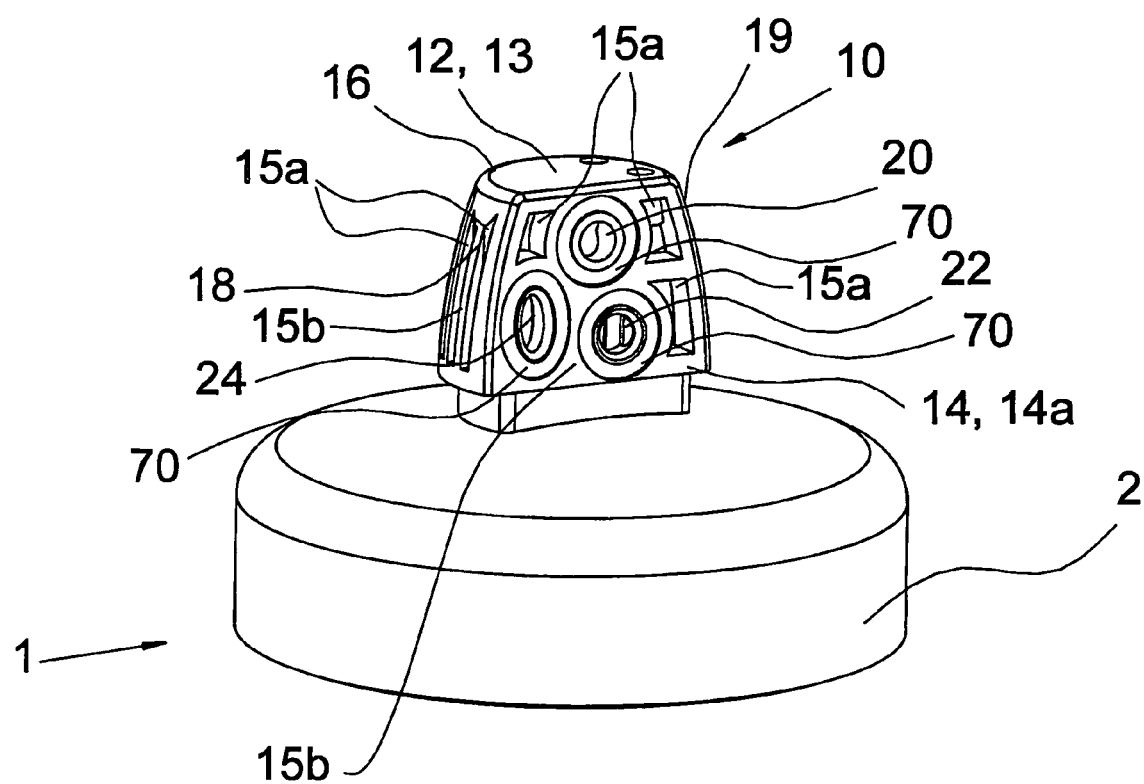
Figure 4B:
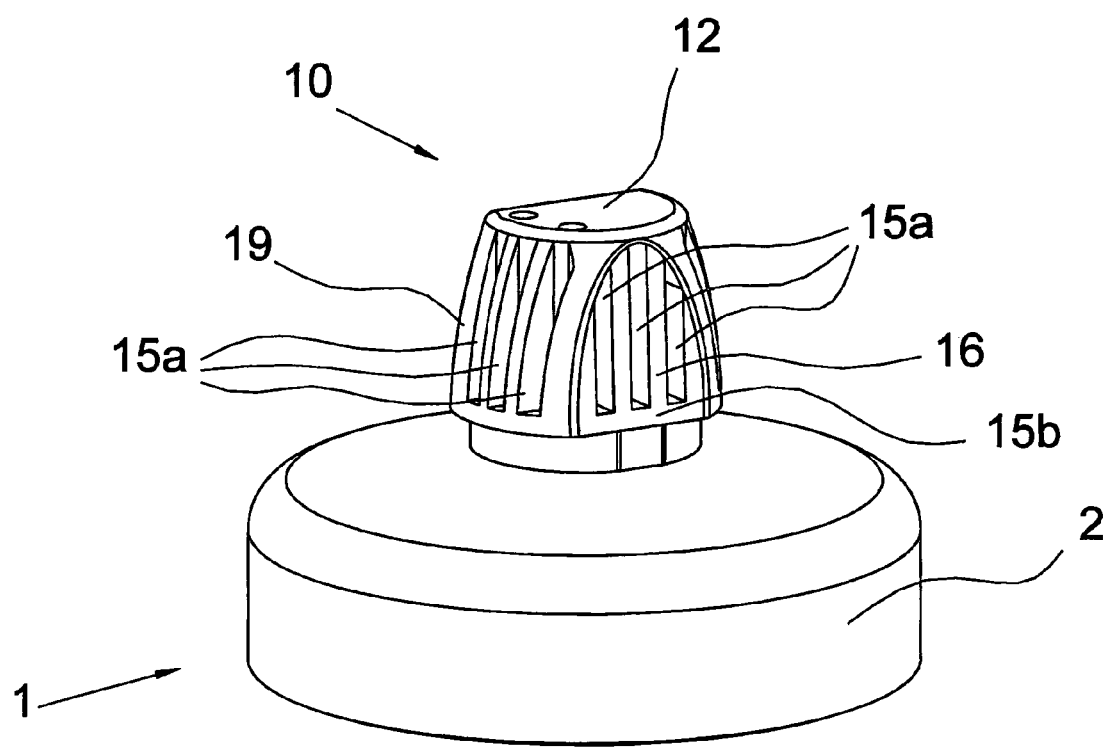

FIG. 4a shows a perspective representation of a cartridge 1. The connecting head 10 is arranged on the receptacle 2, having four side surfaces and one end surface 12. A side surface is formed by the first outer surface section 14, which has three openings. There is a first and a second water inlet opening 20, 22, in order to conduct two partial streams into the interior of the cartridge. Two inlet openings 20, 22 are needed if a diluting mechanism (not shown) is arranged in the connecting element 40 or upstream from the connecting element 40. The partial streams so introduced are subjected to different treatment inside the filtration cartridge and then merged together.

The treated water is taken out from the cartridge 1 via the water outlet opening 24. The two inlet openings 20, 22 are essentially arranged one on top of the other, while the water outlet opening 24 is displaced to the side, next to the two water inlet openings 20, 22. On the back of the connecting head 10 (see FIG. 4b) is the second outer surface section 16. Between the two outer surface sections 14 and 16 are arranged curved side surfaces 18 and 19.

All surfaces 14, 16, 18, 19 have recesses 15a. The recesses 15a in the surface 14 are arranged around the openings 20, 22 and 24. The first outer surface section 14 is thereby reduced to the webs 15b between the recesses 15a and/or the openings 20, 22 and 24.

In the surfaces 16, 18 and 19 the recesses 15a are oblong in shape and separated from each other by corresponding oblong webs 15b. Since the webs and thus the surfaces relevant to the friction extend in the vertical direction, especially in the second outer surface section 16, the friction is reduced when they are fitted together.

Figure 5:
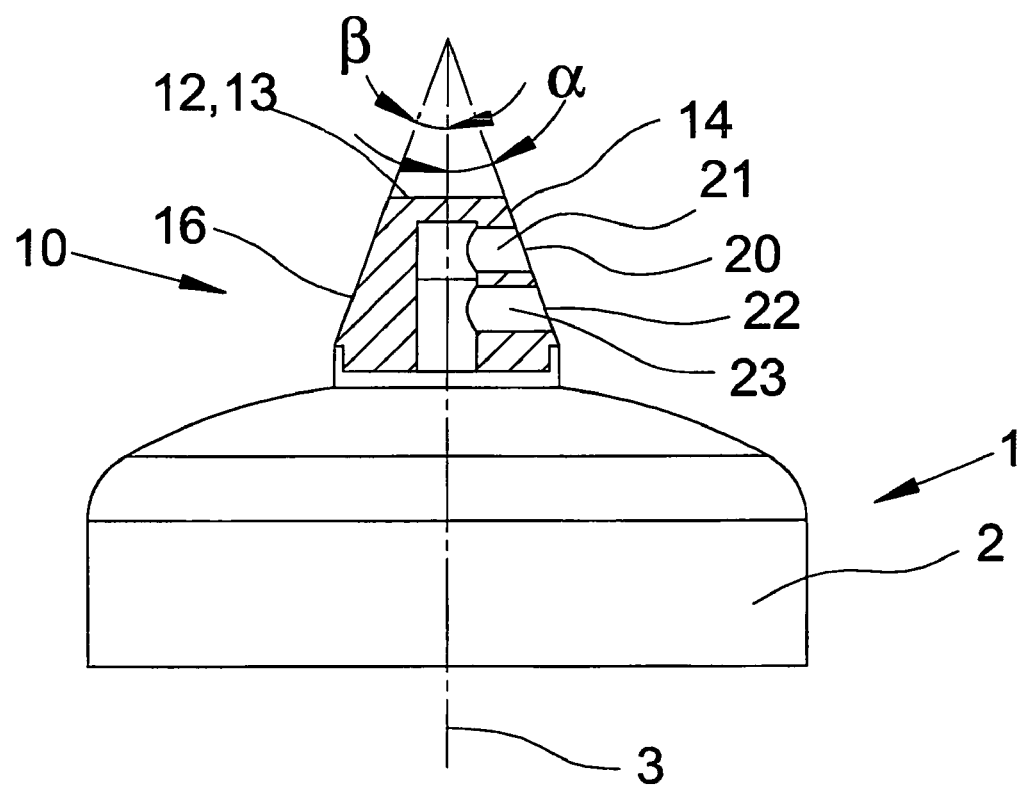

FIG. 5 shows a vertical section through the connecting head 10 of the cartridge shown in FIG. 4a, b. The angles α and β of the flat outer surface sections 14, 16 are indicated with respect to the lengthwise axis 3. In the representation depicted here, the angles α and β are chosen the same.

Figure 6:
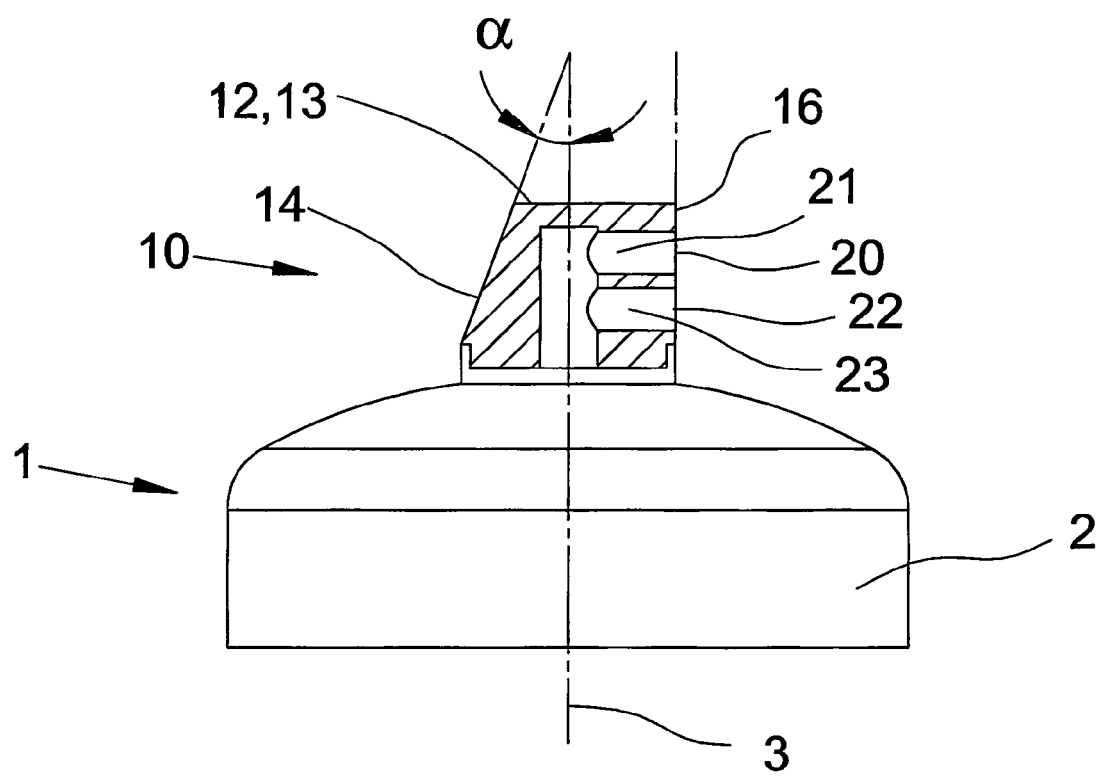

FIG. 6 shows another embodiment, differing in that only the first outer surface section 14 forms a slanting surface, while the angle α is around 10°. The second outer surface section 16 has no inclination, which means that the angle β is zero in this case, i.e., the second outer surface section 16 is parallel to the lengthwise axis 3. Both openings 20, 24 are situated in the second outer surface section 16.

Figure 7:
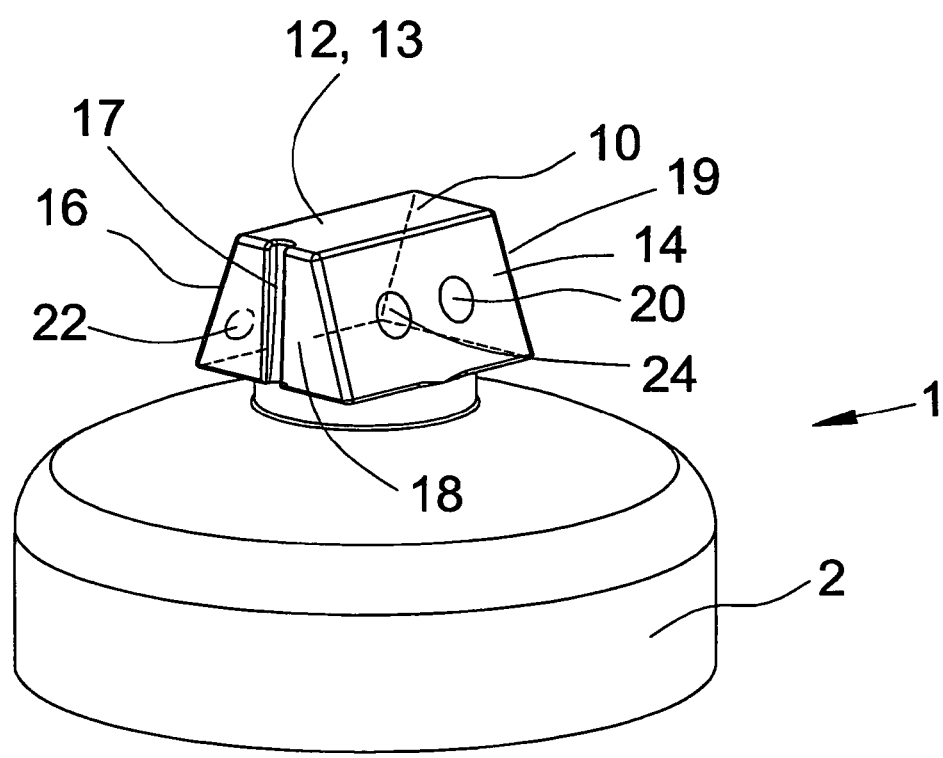

FIG. 7 shows another embodiment, which differs from the embodiment of FIG. 4a, b in that flat side surfaces 18 and 19 are provided and the inlet opening 20 as well as the outlet opening 24 are arranged in the outer surface section 14 and a second inlet opening 22 is arranged in the second outer surface section 16. No seal elements are shown. It is also possible for the seal elements to be arranged in the connecting element 40. Since the connecting head 10 is symmetrical, it has a guiding means 17 in the form of a vertical groove to define the installation position of the surface 18, which cooperates with a corresponding guiding means 47 of the connecting element 40 (see FIG. 14).

Figure 8:
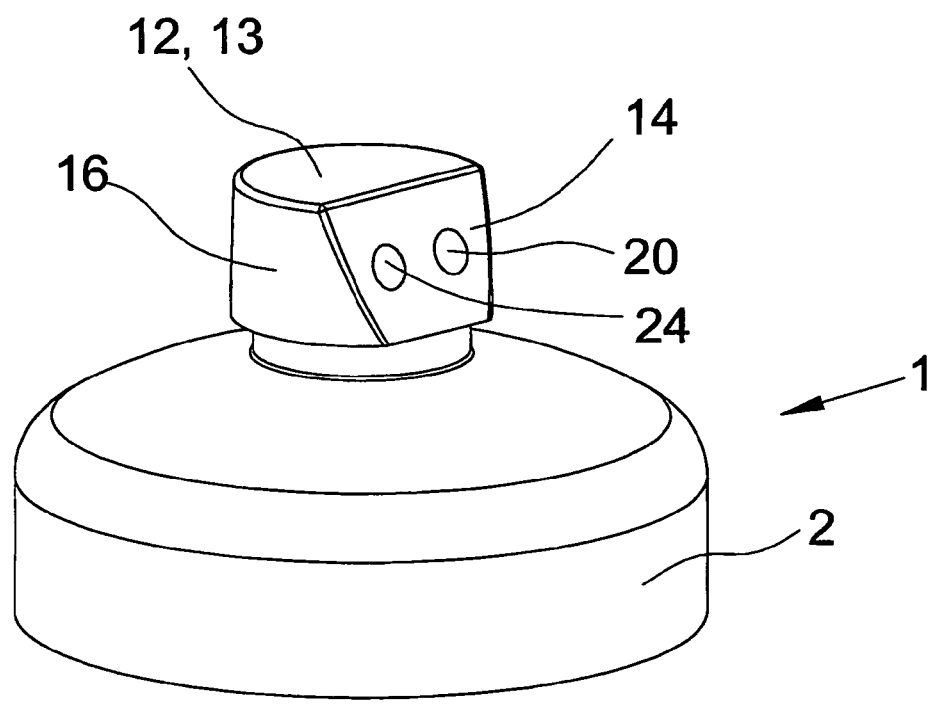

FIG. 8 shows another embodiment, in which the connecting head 10 has a first flat outer surface section 14 with the two openings 20 and 24, but otherwise has a semicylindrical second outer surface section 16.

Figure 9:
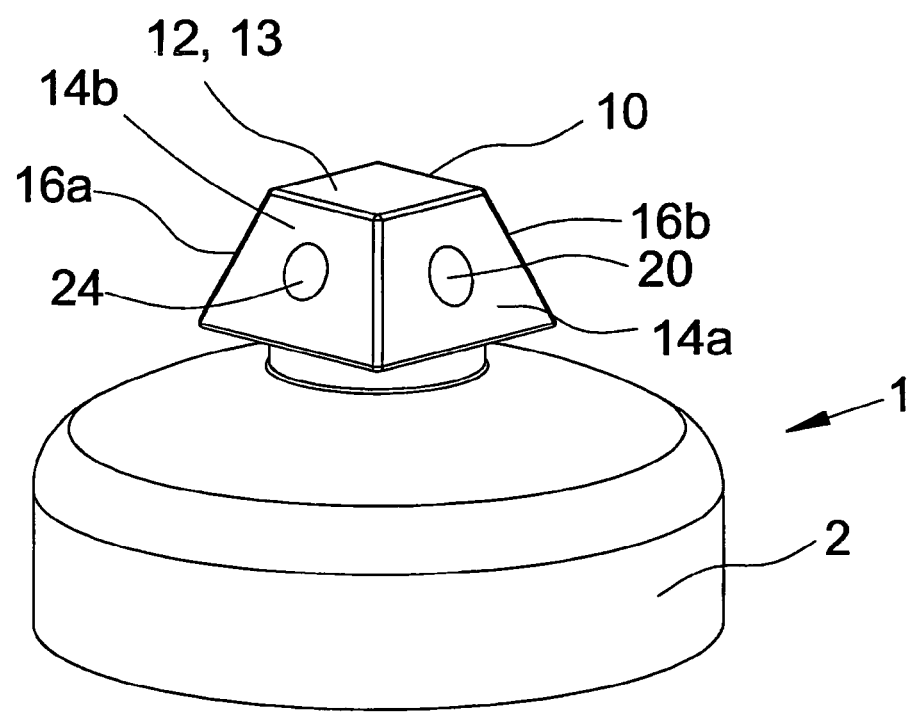

In FIG. 9, the connecting head 10 has a pyramidal shape, while the water inlet opening 20 is provided in the one, first outer surface section 14a, and the water outlet opening 24 in the other, second outer surface section 14b.

Located opposite from the first two outer surface sections 14a, b are two second outer surface sections 16a, b. The corresponding holder 50 has four complementary inside surface sections 54a, b, 56a, b.

Figure 10:
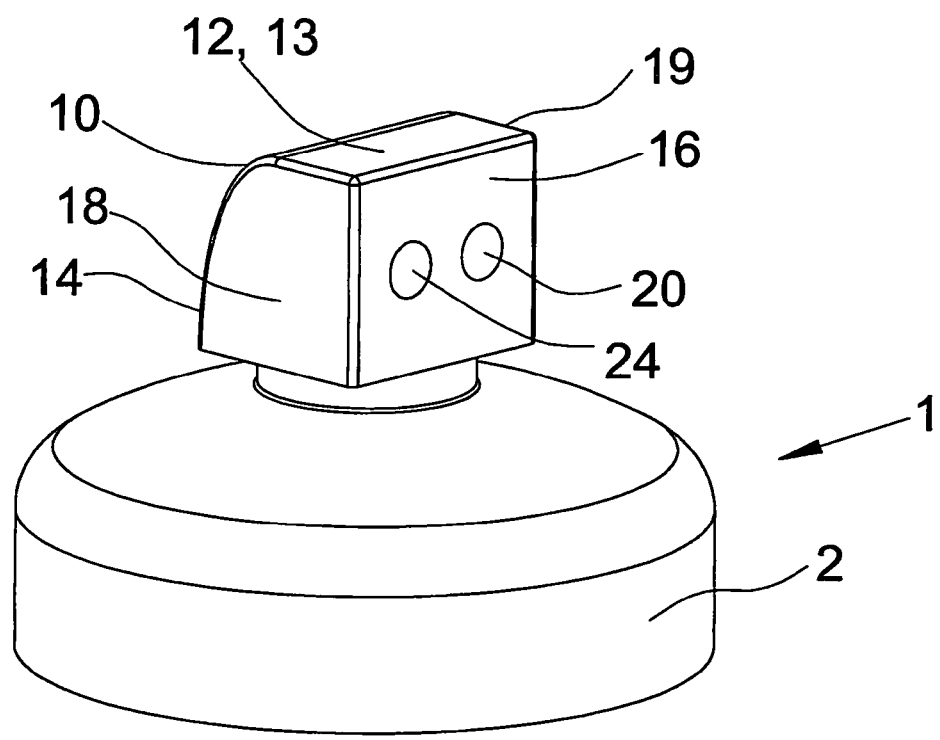

FIG. 10 shows another embodiment of a connecting head 10, which has a first curved outer surface section 14, the curvature increasing with distance away from the receptacle 2 and toward the free end 13 of the connecting head 10. In the area of the free end 13, the first outer surface section 14 passes into the flat end surface 12.

The second outer surface section 16 is formed by a vertical flat surface. Between the outer surface sections 14 and 16 are arranged vertical side surfaces 18 and 19. The two openings 20 and 24 are located in the second outer surface section 16.

Figure 11:
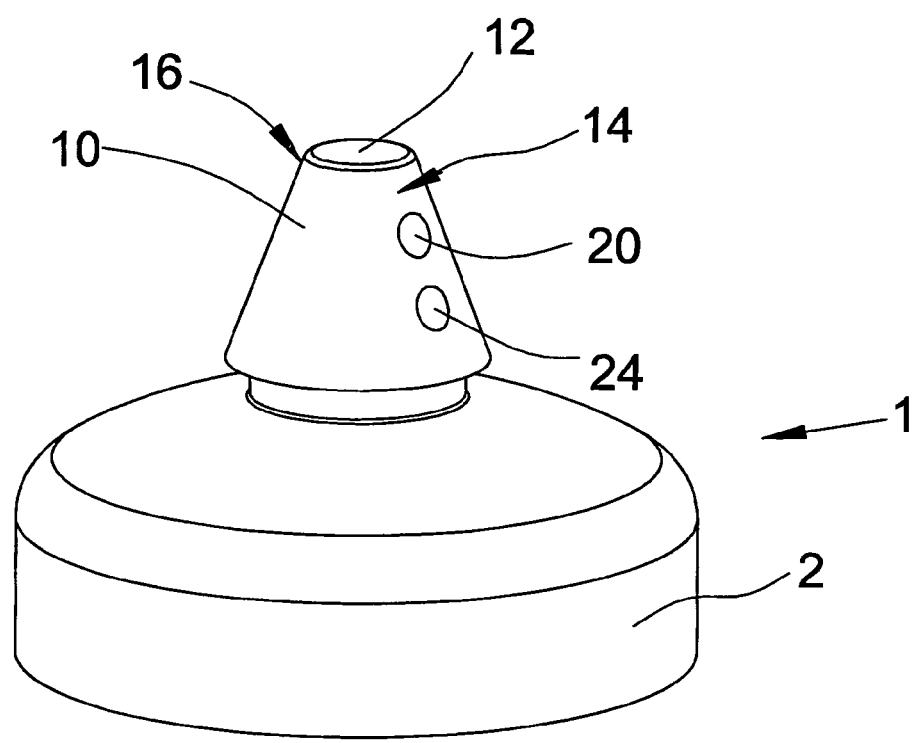

FIG. 11 shows another embodiment of a connecting head 10. The connecting head 10 has a truncated cone shape with a conical envelope surface and a flat end surface 12. In this embodiment, both of the outer surface sections 14 and 16 lie together on the conical surface.

Figure 12:
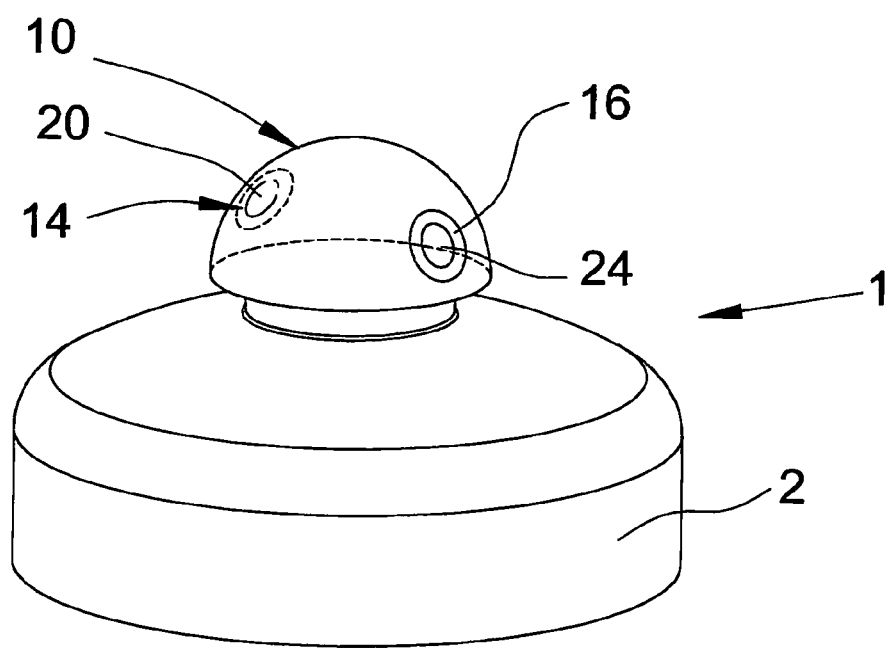

FIG. 12 shows an embodiment in which the connecting head 10 has a hemispherical outer surface. In this embodiment as well, the outer surface sections 14 and 16, constituting a flat annular surface, lie on the common hemispherical surface.

Figure 13:
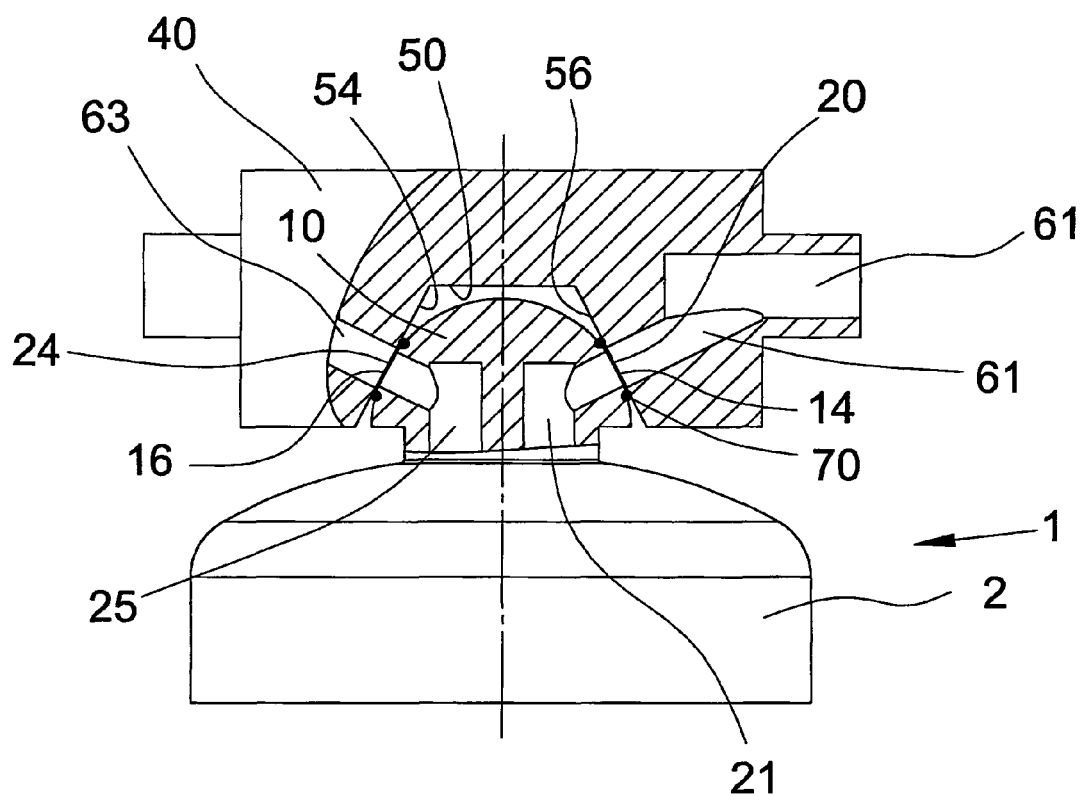

In FIG. 13, the connecting head 10 of FIG. 12 is inserted into a holder 50 with more flat inside surface sections 54 and 56. The two first and second outer surface sections 14 and 16, arranged on the hemisphere, lie against these flat inside surface sections 54 and 56. The channels 61, 63 as well as the end segments of the channels 21, 25 are slanted in this embodiment.

Figure 14:
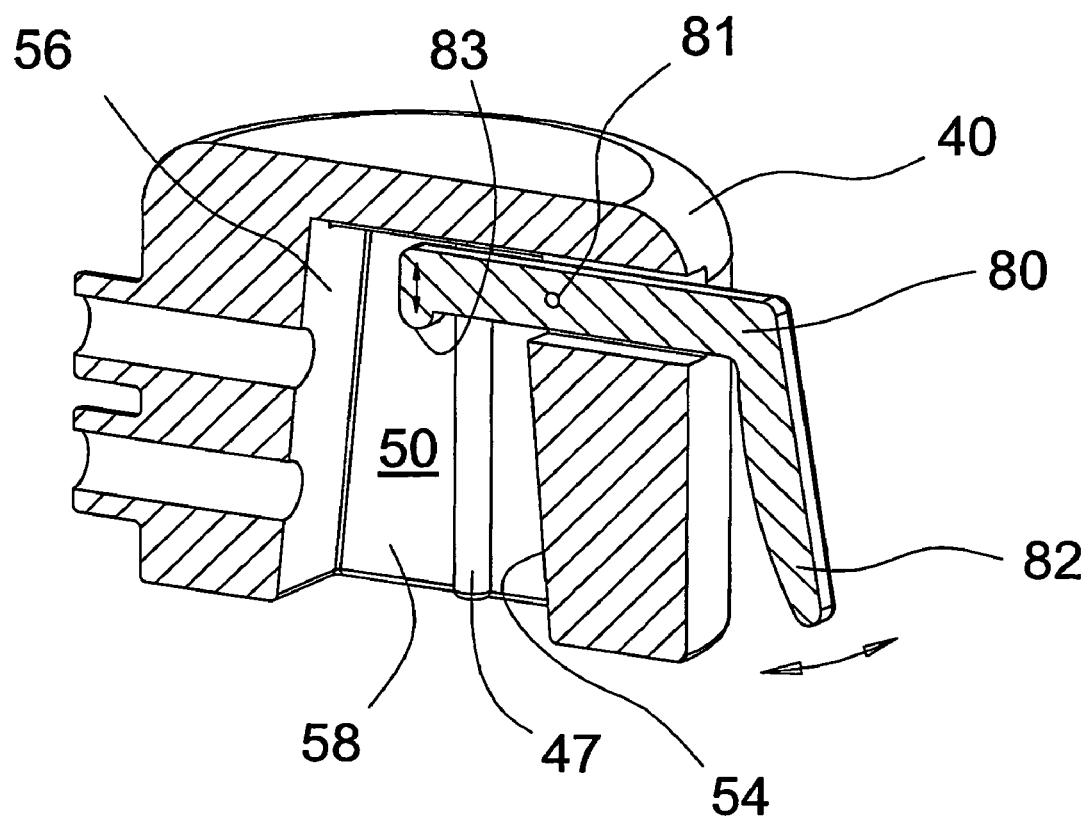

FIG. 14 shows another embodiment of a connecting element 40. Inside the connecting element 40, an ejector 80 is pivoted about a horizontal swinging axle 81. By activating the grip section 82, the hammerlike activating end 83 is moved downward, so that a cartridge (not shown) with its connecting head 10 can be forced downward and out from the holder 50. The inside surface of the holder 50 has, besides the inside surface sections 54, 56, a side surface 58 on which a web 47 is arranged as the guiding means (see also FIG. 7).

LIST OF REFERENCE NUMBERS 1 cartridge
2 receptacle
3 lengthwise axis
6 intermediate space
10 connecting head
12 end surface
13 free end
14, 14a, b first outer surface section
15a recess
15b web
16, 16a, b second outer surface section
17 guiding means
18 side surface
19 side surface
20 first inlet opening
21 first inlet channel
22 second inlet opening
24 outlet opening
25 outlet channel
40 connecting element
42 inlet nipple
44 outlet nipple
46 sleeve ring
47 guiding means
50 holder
52 end surface
54, 54a, b first inside surface section
56, 56a, b second inside surface section
58 side surface
60 inflow opening
61 inflow channel
62 outflow opening
63 outflow channel
70 sealing element
80 ejector
81 swivel axis
82 grip section
83 activating end
90 treatment agent

What is claimed is:

1. Device for treating water comprising:
a cartridge, which has a receptacle for receiving treatment agents for water, and a connecting head arranged on the receptacle, which has at least one inlet opening and at least one outlet opening, and with a connecting element, which has a holder for the connecting head with at least one inflow opening and at least one outflow opening, which are connected to the inlet and outlet openings of the connecting head in a sealing manner by means of sealing elements,
wherein the connecting head has a cross section that tapers with increasing distance from the receptacle toward a free end, while an outer surface of the connecting head has a first outer surface section which is tilted or curved toward a lengthwise axis of the cartridge and a second outer surface section which is opposite to the first outer surface section to define said cross section,
each said at least one inlet opening lying in the first outer surface section or the second outer surface section and each said at least one outlet opening lying in the first outer surface section or the second outer surface section, and the connecting head is inserted in the holder in a direction of the lengthwise axis, while an inside surface of the holder has first and second inside surface sections that complement at least the first and second outside surface section.

2. Device according to claim 1, wherein the connecting head is asymmetrical in shape.

3. Device according to claim 1, wherein the first outer surface section is a flat surface which is tilted relative to the lengthwise axis of the cartridge by an angle $\alpha$, with $0<\alpha<90°$.

4. Device according to claim 3, wherein the angle is $\alpha<20°$.

5. Device according to claim 3, wherein the second outer surface section is a flat surface, which makes an angle $\beta$ with the lengthwise axis of the cartridge with $0 \leq \beta<90°$.

6. Device according to claim 5, wherein $\alpha \neq \beta$.

7. Device according to claim 3, wherein the angle $\alpha$ is 1° to 5°.

8. Device according to claim 1, wherein the first outer surface section is a spherical or conical surface.

9. Device according to claim 1, wherein the second outer surface section is curved.

10. Device according to claim 9, wherein the first outer surface section is flat.

11. Device according to claim 1, wherein the second outer surface section is a spherical or conical surface.

12. Device according to claim 1, wherein the inlet opening is surrounded by a sealing element and outlet opening is surrounded by a sealing element.

13. Device according to claim 12, wherein the sealing elements are o-rings or gaskets.

14. Device according to claim 1, wherein at least the first or the second or both the first and second outside surface section has at least one recess.

15. Device according to claim 1, wherein a smallest inside cross section of the holder is smaller than the smallest outside cross section of the connecting head.

16. Device according to claim 1, wherein the connecting head has at least one guiding means, which cooperates with a guiding means of the holder.

17. Device according to claim 1, wherein a locking element is provided which engages with the cartridge or the connecting element.

18. Device according to claim 17, wherein the locking element is a sleeve ring.

19. Device according to claim 1, wherein at least the connecting head or the holder or both the connecting head and holder consist of a plastic material.

20. Device according to claim 19, wherein at least the connecting head or the holder or both the connecting head and holder are injection molded.

21. Device according to claim 1, wherein the connecting element has an ejector.

22. Cartridge with a receptacle for receiving treatment agents for water, comprising: a connecting head arranged on the receptacle for connecting to a connecting element; wherein the connecting head has at least one inlet opening and at least one outlet opening on an outer surface of the connector head, wherein the connecting head has a cross section that tapers with increasing distance from the receptacle toward a free end, while the outer surface has a first outer surface section which is tilted or curved toward a lengthwise axis of the cartridge and a second outer surface section which is opposite to the first outer surface section to define said cross section, and each said at least one inlet opening lying in the first outer surface section or the second outer surface section and each said at least one outlet opening lying in the first outer surface section or the second outer surface section.

23. Device according to claim 1, wherein the connecting head is asymmetrical in shape.

24. Device according to claim 1, wherein the first outer surface section is a flat surface which is tilted relative to the lengthwise axis of the cartridge by an angle $\alpha$, with $0<\alpha<90°$.

25. Device according to claim 24, wherein the angle is $\alpha$ 20°.

26. Device according to claim 24, wherein the angle $\alpha$ is 1° to 5°.

27. Device according to claim 24, wherein the second outer surface section is a flat surface, which makes an angle $\beta$ with the lengthwise axis of the cartridge with $0 \leq \beta<90°$.

28. Device according to claim 27, wherein $\alpha \neq \beta$.

29. Device according to claim 22, wherein the first outer surface section is a spherical or conical surface.

30. Cartridge according to claim 22, wherein the second outer surface section is curved.

31. Device according to claim 30, wherein of the first outer surface section is flat.

32. Device according to claim 22, wherein the second outer surface section is a spherical or conical surface.

33. Device according to claim 22, wherein the inlet opening is surrounded by a sealing element and outlet opening is surrounded by a sealing element.

34. Device according to claim 33, wherein the sealing elements are o-rings or gaskets.

35. Device according to claim 22, wherein at least the first or the second or both the first and second outside surface section has at least one recess.

36. Device according to claim 22, wherein the connecting head has at least one guiding means, which cooperates with a guiding means of the holder.

* * * * *